(12) United States Patent
Saito et al.

(10) Patent No.: US 12,386,649 B2
(45) Date of Patent: Aug. 12, 2025

(54) SERVER MAINTENANCE CONTROL DEVICE, SERVER MAINTENANCE SYSTEM, SERVER MAINTENANCE CONTROL METHOD, AND PROGRAM

(71) Applicant: Nippon Telegraph and Telephone Corporation, Tokyo (JP)

(72) Inventors: Shogo Saito, Musashino (JP); Naoki Takada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 455 days.

(21) Appl. No.: 18/014,855

(22) PCT Filed: Sep. 8, 2020

(86) PCT No.: PCT/JP2020/033954
§ 371 (c)(1),
(2) Date: Jan. 6, 2023

(87) PCT Pub. No.: WO2022/009438
PCT Pub. Date: Jan. 13, 2022

(65) Prior Publication Data
US 2023/0289203 A1    Sep. 14, 2023

(30) Foreign Application Priority Data
Jul. 10, 2020 (WO) .................. PCT/JP2020/026992

(51) Int. Cl.
*G06F 9/455* (2018.01)
(52) U.S. Cl.
CPC ............ *G06F 9/45558* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS 8,874,749 B1 * 10/2014 Vittal .................. H04L 67/1001
709/226
9,361,139 B1 * 6/2016 Baig .................... G06F 9/5077
(Continued)

OTHER PUBLICATIONS

[No Author Listed] [online], "Chapter 12 Maintenance, Troubleshooting and Debugging," OpenStack Operations Guide, retrieved on Mar. 30, 2020, retrieved from URL <http://openstack-ja.github.io/openstack-manuals/openstack-ops/content/maintenance.html>, 23 pages (with English Translation).

*Primary Examiner* — Adam Lee
(74) *Attorney, Agent, or Firm* — Fish & Richardson P.C.

(57) ABSTRACT

A controller server includes an assignment unit that assigns devices connected to a server to virtual machines, a usage status management unit that records correspondence between the virtual machines and devices used by the virtual machines, a warning relation management unit that records types of warnings that may occur for each of the devices during maintenance, a maintenance control unit that determines an order of an instruction for suppressing issuance of a warning that may occur for the devices during maintenance and an instruction for evacuating an affected virtual machine among the virtual machines to another server, a warning exclusion setting unit that instructs the server to exclude issuance of a warning that may occur for a device due to the maintenance, and an affected user specification evacuation unit that specifies the affected virtual machine, and evacuates the affected virtual machine from the server to the another server.

8 Claims, 17 Drawing Sheets

(56) References Cited

U.S. PATENT DOCUMENTS

| | | | | |
|---|---|---|---|---|
| 10,725,885 | B1* | 7/2020 | Paraschiv | G06F 11/3433 |
| 11,157,263 | B1* | 10/2021 | Zhang | G06F 8/65 |
| 11,474,857 | B1* | 10/2022 | Biemueller | G06F 9/45558 |
| 2006/0085668 | A1* | 4/2006 | Garrett | G06F 9/5061 |
| | | | | 714/4.1 |
| 2008/0163207 | A1* | 7/2008 | Reumann | H04L 63/0263 |
| | | | | 718/1 |
| 2009/0144579 | A1* | 6/2009 | Swanson | G06F 11/0712 |
| | | | | 718/1 |
| 2009/0300606 | A1* | 12/2009 | Miller | G06F 9/45558 |
| | | | | 718/1 |
| 2010/0017800 | A1* | 1/2010 | Dow | G06F 9/45533 |
| | | | | 718/1 |
| 2010/0071025 | A1* | 3/2010 | Devine | G06F 9/4856 |
| | | | | 718/1 |
| 2010/0161922 | A1* | 6/2010 | Sharp | G06F 9/45558 |
| | | | | 718/1 |
| 2010/0306381 | A1* | 12/2010 | Lublin | G06F 15/16 |
| | | | | 709/226 |
| 2011/0107148 | A1* | 5/2011 | Franklin | G06F 11/0748 |
| | | | | 718/1 |
| 2012/0066677 | A1* | 3/2012 | Tang | G06F 9/4856 |
| | | | | 718/1 |
| 2012/0195187 | A1* | 8/2012 | Ashihara | G06Q 50/00 |
| | | | | 370/235 |
| 2013/0191543 | A1* | 7/2013 | Abbondanzio | H04L 47/70 |
| | | | | 709/226 |
| 2013/0205106 | A1* | 8/2013 | Tati | G06F 3/061 |
| | | | | 711/159 |
| 2013/0219384 | A1* | 8/2013 | Srinivasan | H04L 12/462 |
| | | | | 718/1 |
| 2014/0007089 | A1* | 1/2014 | Bosch | G06F 9/4856 |
| | | | | 718/1 |
| 2014/0082616 | A1* | 3/2014 | Kurita | H04L 49/70 |
| | | | | 718/1 |
| 2014/0115164 | A1* | 4/2014 | Kalyanaraman | H04L 67/34 |
| | | | | 709/226 |
| 2014/0372788 | A1* | 12/2014 | Vavrick | G06F 9/45558 |
| | | | | 714/4.1 |
| 2015/0007174 | A1* | 1/2015 | Jain | G06F 9/45533 |
| | | | | 718/1 |
| 2015/0043379 | A1* | 2/2015 | Shimokuni | H04L 45/586 |
| | | | | 370/254 |
| 2015/0169349 | A1* | 6/2015 | Joffe | G06F 9/4856 |
| | | | | 718/1 |
| 2016/0077859 | A1* | 3/2016 | Cropper | G06F 9/4418 |
| | | | | 718/1 |
| 2016/0085560 | A1* | 3/2016 | Gourlay | G06F 9/45558 |
| | | | | 713/2 |
| 2016/0139946 | A1* | 5/2016 | Gardner | G06F 9/5077 |
| | | | | 718/1 |
| 2016/0253198 | A1* | 9/2016 | Gallant | G06F 9/45558 |
| | | | | 718/1 |
| 2016/0266923 | A1* | 9/2016 | Miyoshi | G06F 3/0647 |
| 2016/0283261 | A1* | 9/2016 | Nakatsu | G06F 9/45558 |
| 2017/0039120 | A1* | 2/2017 | Ganesan | G06F 11/3055 |
| 2017/0364394 | A1* | 12/2017 | Fujita | G06F 9/5088 |
| 2018/0136960 | A1* | 5/2018 | Zhang | G06F 9/4856 |
| 2018/0157532 | A1* | 6/2018 | Kumar | G06F 9/4881 |
| 2019/0068442 | A1* | 2/2019 | Kondo | H04L 41/0879 |
| 2019/0243550 | A1* | 8/2019 | Franciosi | G06F 3/0647 |
| 2019/0278624 | A1* | 9/2019 | Bade | G06F 9/4868 |
| 2019/0286475 | A1* | 9/2019 | Mani | G06F 9/45558 |
| 2019/0288914 | A1* | 9/2019 | Celozzi | H04L 41/0897 |
| 2020/0042340 | A1* | 2/2020 | Wiggers | G06F 9/5077 |
| 2020/0183725 | A1* | 6/2020 | Grehan | G06F 3/0664 |
| 2020/0257554 | A1* | 8/2020 | Okuno | G06F 9/5077 |
| 2020/0371830 | A1* | 11/2020 | Kalley | H04L 41/0816 |
| 2021/0004000 | A1* | 1/2021 | Kalaskar | G06F 9/45545 |
| 2021/0042197 | A1* | 2/2021 | Rivera | G06F 9/45558 |
| 2021/0149774 | A1* | 5/2021 | Denneman | G06F 11/1448 |
| 2021/0157624 | A1* | 5/2021 | Saxena | G06F 9/4856 |
| 2021/0263762 | A1* | 8/2021 | Kachare | G06F 12/0862 |
| 2021/0383206 | A1* | 12/2021 | Teppoeva | G06F 11/004 |

* cited by examiner

Fig. 3

| USER ID | DEVICE ID |
|---|---|
| FIRST USER | FIRST DEVICE |
| SECOND USER | SECOND DEVICE, THIRD DEVICE |
| THIRD USER | ... |
| ⋮ | ⋮ |

| DEVICE ID | EXCLUSION TARGET TYPE OF WARNING |
|---|---|
| FIRST DEVICE | REBOOT |
| SECOND DEVICE | SHUT DOWN |
| THIRD DEVICE | UNAVAILABLE |
| ⋮ | ⋮ |

12b

SERVER MAINTENANCE CONTROL DEVICE, SERVER MAINTENANCE SYSTEM, SERVER MAINTENANCE CONTROL METHOD, AND PROGRAM

CROSS-REFERENCE TO RELATED APPLICATIONS

This application is a National Stage application under 35 U.S.C. § 371 of International Application No. PCT/JP2020/033954, having an International Filing Date of Sep. 8, 2020, which claims priority to International Application No. PCT/JP2020/026992, having an International Filing Date of Jul. 10, 2020. The disclosure of the prior applications are considered part of the disclosure of this application, and are incorporated by reference in their entirety into this application.

TECHNICAL FIELD

The present invention relates to a server maintenance control device, a server maintenance system, a server maintenance control method, and a program used for detecting a failure of a device connected to a physical server and performing maintenance of the device in a system in which the physical server is assigned to users on demand and virtual machines on the physical server are used.

BACKGROUND ART

In recent years, a virtual infrastructure has been widespread. The virtual infrastructure is a system by which physical resources such as physical servers and networks are abstracted and concealed using virtualization technology and a common infrastructure for a plurality of applications and services is provided. The physical servers of the virtual infrastructure are assigned to users on demand in response to requests from the users. Furthermore, to the physical servers of the virtual infrastructure, a plurality of various external devices such as graphics processing units (GPUs), field programmable gate arrays (FPGAs), network interface cards (NICs), or the like (hereinafter, referred to as "devices") is connected.

Each of the users requests a resource from each of the physical servers and temporarily uses a virtual machine deployed on each of the physical servers. At this time, each virtual machine uses any number of devices. Each of the devices requires maintenance irregularly. The virtual machine cannot use a maintenance target device during maintenance of the device.

Conventionally, in maintenance of a device, the following processing is performed by a controller server (see, for example, Non Patent Literature 1).

(1) An entire physical server to which a maintenance target device is connected is set to be excluded from warning monitoring.
(2) An instance (virtual machine) of a user using the physical server to which the maintenance target device is connected is evacuated (migrated) to another server.

CITATION LIST

Non Patent Literature

Non Patent Literature 1: "open stack Operation Guide Chapter 12 Maintenance, Failure, and Debug", [online], [Searched on Jun. 10, 2020], Internet <URL:http://openstack-ja.github.io/openstack-manuals/openstack-ops/content/maintenance.html>

SUMMARY OF INVENTION

Technical Problem

However, in the related art, an instance (virtual machine) not using a maintenance target device has been also evacuated (migrated). Therefore, an instance (virtual machine) not using a maintenance target device has been affected, for example, to temporarily stop.

Furthermore, in the related art, since an entire physical server is excluded from a warning monitoring target, a warning of an instance (virtual machine) not using a maintenance target device has been also suppressed. Furthermore, in a case of a device failure, the device requires maintenance, but if maintenance is not performed in a correct procedure at this time, an instance (virtual machine) not using the maintenance target device has stopped, or a warning associated with the maintenance of the device has occurred.

The present invention has been made to solve the above issues, and a main object thereof is to provide a server maintenance control device, a server maintenance system, a server maintenance control method, and a program that, on a physical server to which a maintenance target device is connected, suppress issuance of a warning associated with the maintenance of the device while suppressing processing of evacuating a virtual machine not using the device to another physical server. Furthermore, another object is to perform maintenance of a device using detection of the device failure as a trigger.

Solution to Problem

In order to solve the above issues, a server maintenance control device according to the present invention includes an assignment unit that assigns devices connected to a server to virtual machines managed by users, a usage status management unit that records correspondence between the virtual machines and devices used by the virtual machines, a warning relation management unit that records types of warnings that may occur for each of the devices during maintenance, a maintenance control unit that, upon accepting a maintenance request, determines an order of an instruction for suppressing issuance of a warning that may occur for the devices during maintenance and an instruction for evacuating an affected virtual machine affected by maintenance among the virtual machines to another server, a warning exclusion setting unit that instructs the server to suppress issuance of a warning that may occur for a device during the maintenance on the basis of the types of warnings recorded in the warning relation management unit, and an affected user specification evacuation unit that specifies the affected virtual machine on the basis of correspondence between the virtual machines and devices used by the virtual machines recorded in the usage status management unit, and evacuates the affected virtual machine from the server to the another server.

Advantageous Effects of Invention

According to the present invention, on a physical server to which a maintenance target device is connected, issuance of a warning associated with maintenance of the device can be suppressed while processing of evacuating a virtual machine not using the device to another physical server is suppressed. Furthermore, maintenance of a device can be performed using detection of the device failure as a trigger.

BRIEF DESCRIPTION OF DRAWINGS

FIG. 3 is an explanatory diagram of a usage status database.

FIG. 4 is an explanatory diagram of a warning relation database.

DESCRIPTION OF EMBODIMENTS

Figure 1A:
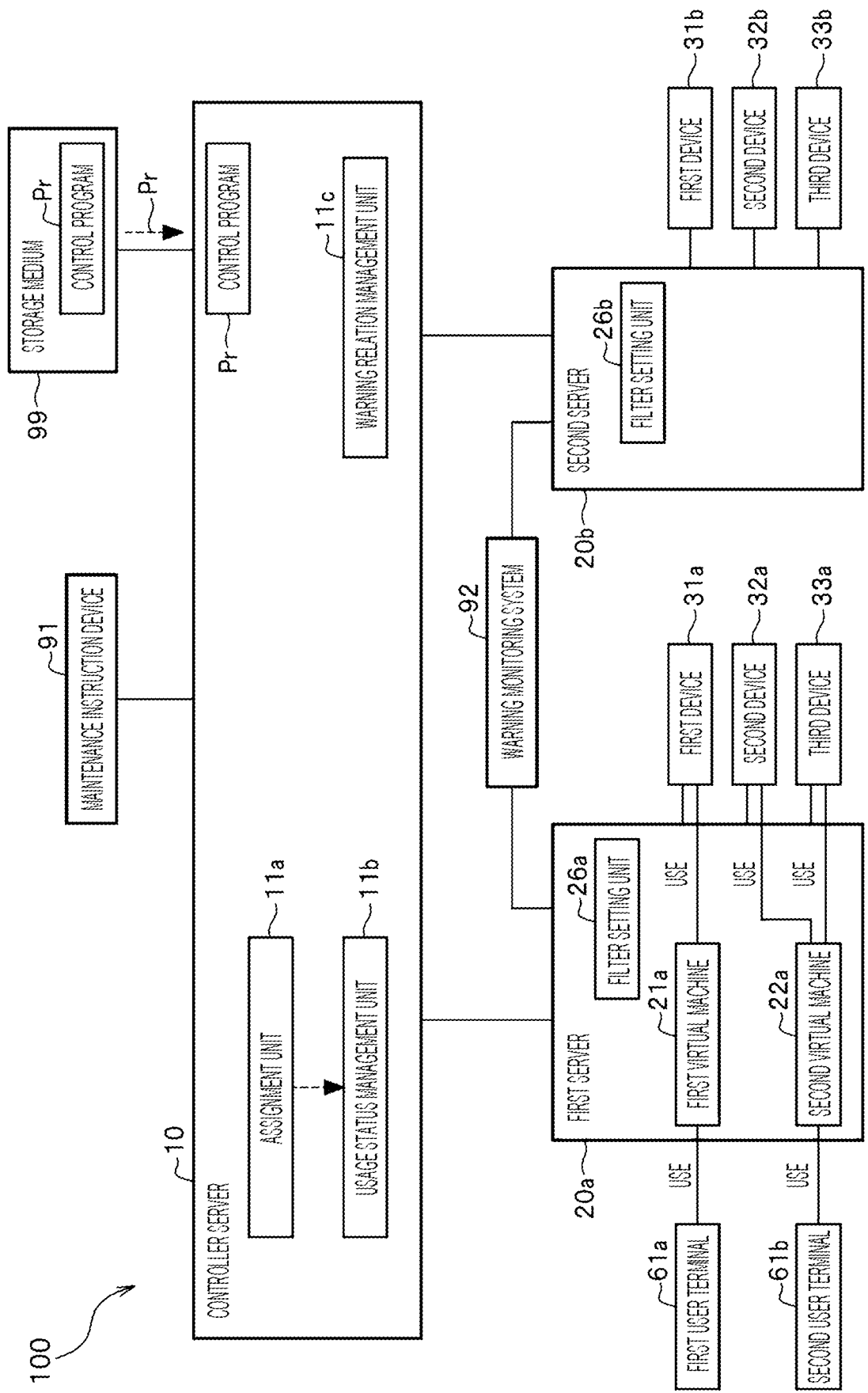
FIG. 1A is an explanatory diagram (1) of an overall configuration and operation of a server system including a controller server (server maintenance control device) according to a first embodiment.

Hereinafter, embodiments of the present invention (hereinafter, referred to as "the present embodiments") will be described in detail with reference to the drawings. Note that the drawings are only schematically illustrated to the extent that the present invention can be sufficiently understood. Therefore, the present invention is not limited only to the illustrated examples. Furthermore, in the drawings, the same reference signs are given to common components and similar components, and duplicate description thereof will be omitted.

First Embodiment

<Overall Configuration and Operation of Server System>

Figure 1B:
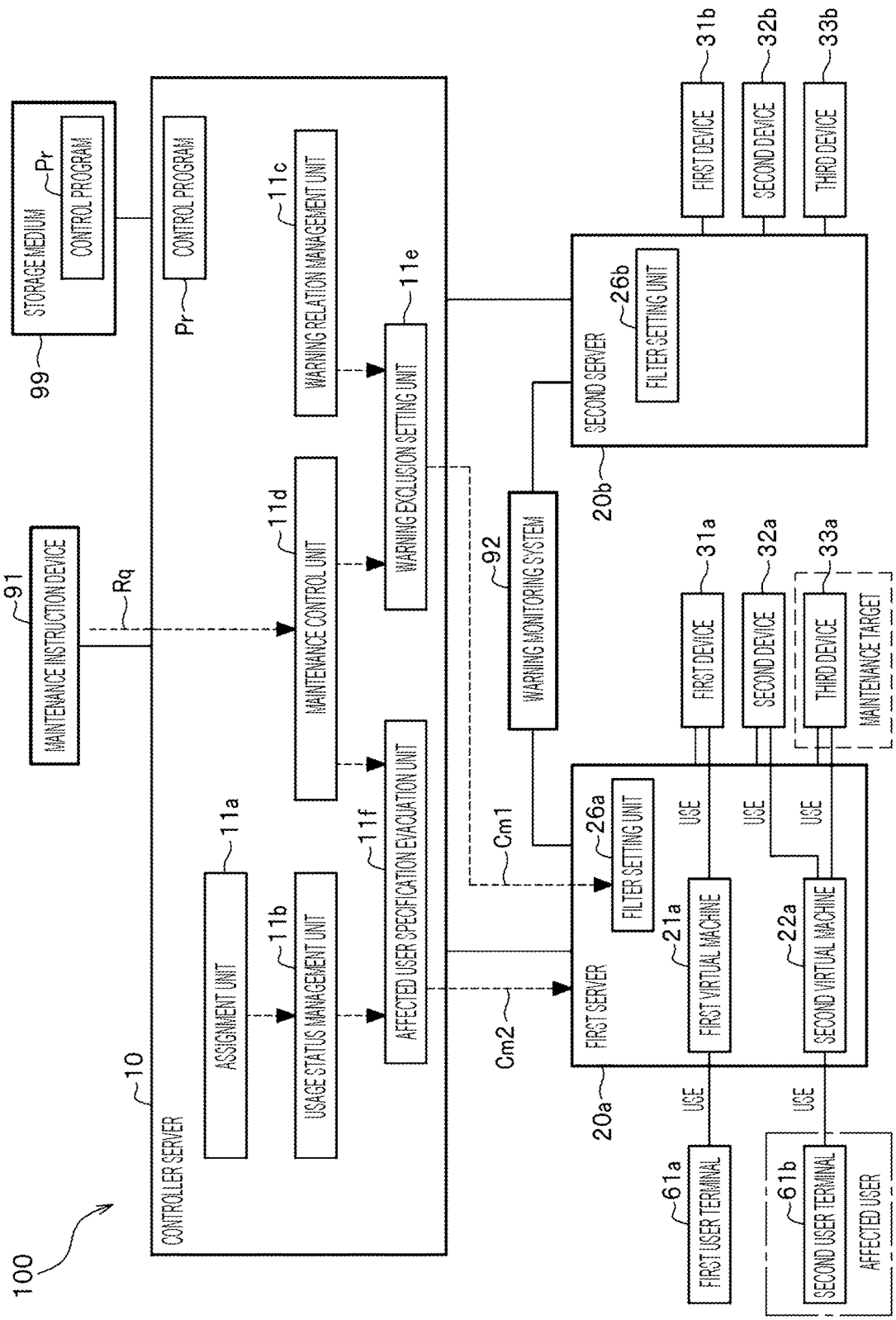
FIG. 1B is an explanatory diagram (2) of the overall configuration and the operation of the server system including the controller server (server maintenance control device) according to the first embodiment.
Figure 1C:
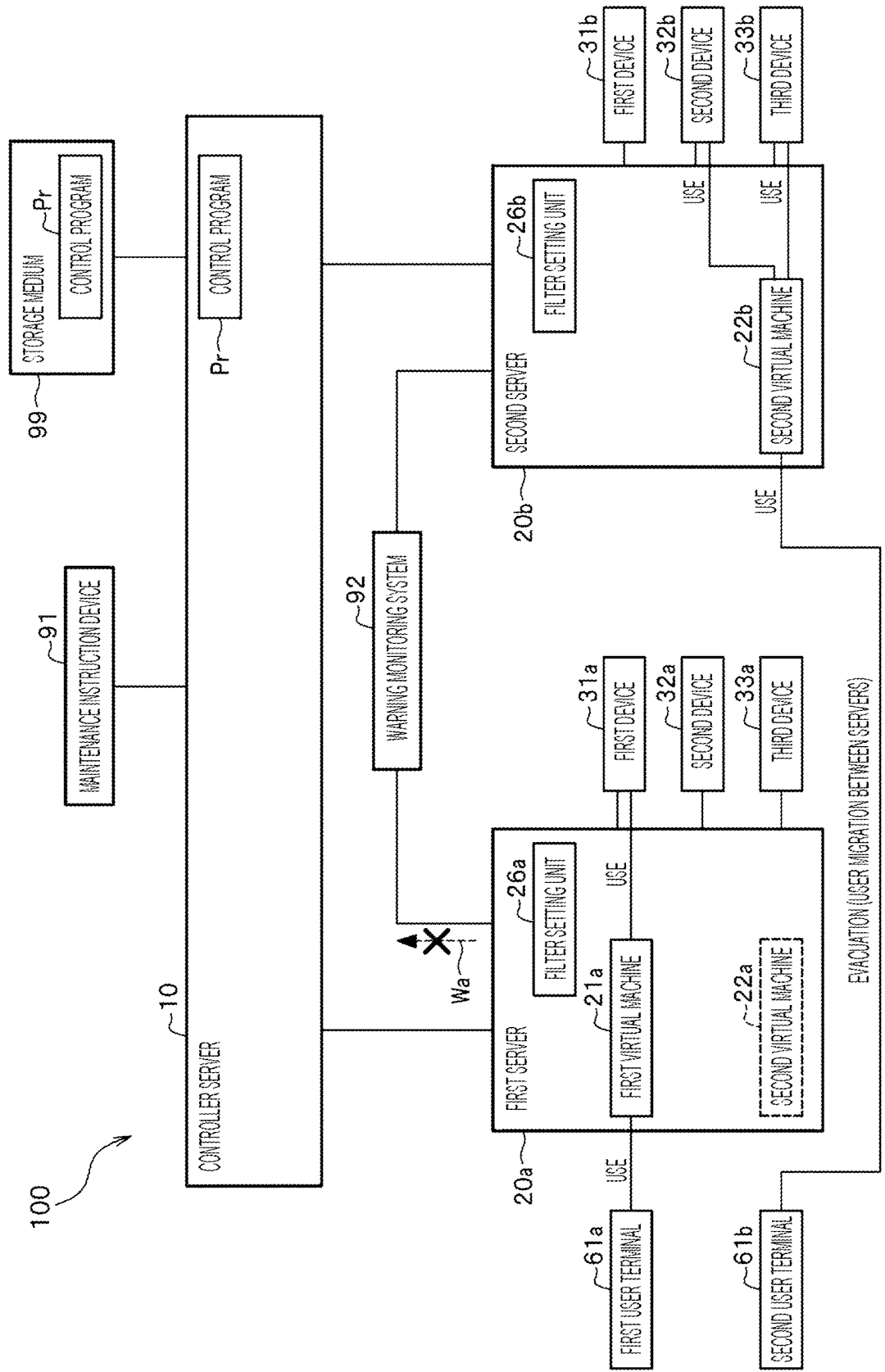
FIG. 1C is an explanatory diagram (3) of the overall configuration and the operation of the server system including the controller server (server maintenance control device) according to the first embodiment.

Hereinafter, an overall configuration and operation of a server system 100 (server maintenance system) including a controller server 10 according to a first embodiment will be described with reference to FIGS. 1A to 1C. FIGS. 1A to 1C are explanatory diagrams of the overall configuration and the operation of the server system 100 including the controller server 10 (server maintenance control device) according to the first embodiment.

As illustrated in FIGS. 1A to 1C, the server system 100 includes the controller server 10, a plurality of physical servers, a maintenance instruction device 91, and a warning monitoring system 92. In the first embodiment, the description will be given on the assumption that the server system 100 includes two physical servers of a first server 20a and a second server 20b. However, the number of the physical servers may be three or more.

The controller server 10 is a computer that functions as a server maintenance control device that controls maintenance processing of the physical servers.

Each of the physical servers (the first server 20a and the second server 20b in the first embodiment) is a computer that provides users with a virtualized environment.

The maintenance instruction device 91 is a terminal device that transmits a maintenance request Rq (see FIG. 1B) to the controller server 10 at the time of maintenance of an external device connected to each of the physical servers.

The warning monitoring system 92 is a system that monitors a warning issued from each of the physical servers and notifies an administrator or the like.

Each of the physical servers is electrically connected to a plurality of various external devices. The plurality of external devices is, for example, graphics processing units (GPUs), field programmable gate arrays (FPGAs), network interface cards (NICs), or the like. Hereinafter, these external devices are simply referred to as "devices".

For example, in an example illustrated in FIG. 1A, a first device 31a, a second device 32a, and a third device 33a are connected to the first server 20a. Similarly, a first device 31b, a second device 32b, and a third device 33b are connected to the second server 20b. The devices connected to the first server 20a and the devices connected to the second server 20b are of the same type. That is, the first device 31a of the first server 20a and the first device 31b of the second server 20b are of the same type. Furthermore, the second device 32a of the first server 20a and the second device 32b of the second server 20b are of the same type. Furthermore, the third device 33a of the first server 20a and the third device 33b of the second server 20b are of the same type. Note that the first server 20a and the second server 20b can be connected to three or more devices.

Note that, unlike a central processing unit (CPU), a device such as a GPU and an FPGA often does not have a function specialized for temporary evacuation (migration) of an internal state. For this reason, a device such as a GPU or an FPGA requires evacuation processing by software, and the evacuation processing requires a relatively long time. That is, a device such as a GPU and an FPGA is a device that requires a relatively high setting cost at the time of evacuation. A plurality of devices connected to the physical servers includes such devices such as GPUs and FPGAs. Therefore, even in maintenance work of a certain device, another virtual machine not using the maintenance target device can preferably be continuously used without being evacuated.

Furthermore, each of the physical servers includes a filter setting unit for filtering a warning that should not be issued (warning that is not a monitoring target) and suppressing issuance of the warning. For example, the first server 20a includes a filter setting unit 26a. Similarly, the second server 20b includes a filter setting unit 26b. In the first embodiment, the filter setting units 26a and 26b operate in a case where issuance of a warning associated with maintenance of a device is suppressed.

In the controller server 10, a control program Pr for causing a computer to function as a server maintenance control device is installed in advance from a storage medium 99. The controller server 10 is communicably connected to each of the physical servers (the first server 20a and the second server 20b in the first embodiment) and the maintenance instruction device 91.

Figure 2:
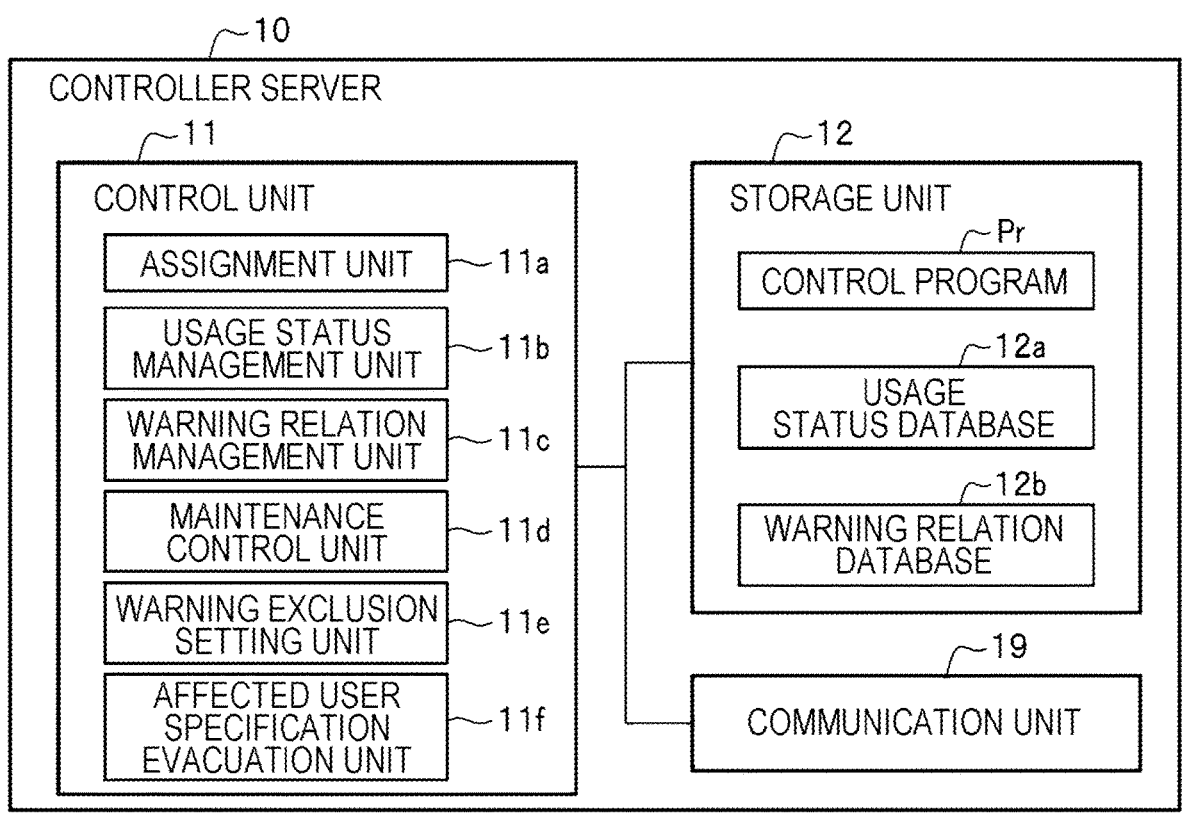
FIG. 2 is a configuration block diagram of the controller server.

The controller server 10 internally constructs a configuration illustrated in FIG. 2 by performing the control program Pr. As a result, the controller server 10 implements the following first to sixth functions.

An assignment unit 11a implements a device assignment function for virtual machines of users (first function) (see FIGS. 1A and 1B). The "device assignment function for users" is a function of assigning any number of devices connected to a server to each of the virtual machines managed by the users.

A usage status management unit 11b implements a device usage status recording function (second function) (see FIGS. 1A and 1B). The "device usage status recording function" is a function of recording the correspondence between each of the virtual machines managed by the users and the devices used by each of the virtual machines. The device usage status recording function is implemented by the usage status management unit 11b and a usage status database 12a to be described below (see FIG. 2).

A warning relation management unit 11c implements a warning relation recording function (third function) (see FIGS. 1A and 1B). The "warning relation recording function" is a function of recording and managing the correspondence between the devices and types of warnings that may occur during maintenance of the devices, that is, recording and managing the correspondence relation between each of the devices and an exclusion target type of a warning that is an exclusion target of monitoring during the maintenance of each of the devices. The warning relation recording function is implemented by the warning relation management unit 11c and a warning relation database 12b to be described below (see FIG. 2).

A maintenance control unit 11d implements a maintenance request acceptance function (fourth function) (see FIG. 1B). The "maintenance request acceptance function" is a function of, upon accepting a maintenance request Rq for a device (see FIG. 1B) from the external maintenance instruction device 91, determining the order of an instruction for excluding (suppressing) issuance of a warning that may occur during maintenance of the device, and an instruction for evacuating a virtual machine affected by the maintenance of the device to another physical server. Hereinafter, the virtual machine affected by maintenance of a device is referred to as an "affected virtual machine".

A warning exclusion setting unit 11e implements a warning exclusion setting function (fifth function) (see FIG. 1B). The "warning exclusion setting function" is a function of instructing a physical server to exclude (suppress) issuance of the warning that may occur due to the maintenance of the device.

An affected user specification evacuation unit 11f implements an affected user specification/evacuation function (sixth function) (see FIG. 1B). The "affected user specification/evacuation function" is a function of specifying an affected virtual machine and evacuating the affected virtual machine from the physical server (the first server 20a in the first embodiment) to another physical server (the second server 20b in the first embodiment).

The physical server is provided on demand in response to requests from a plurality of user terminals. Each user uses a virtual machine on the provided physical server. For example, in the example illustrated in FIG. 1A, the first server 20a is provided to a first user on demand in response to a request from a first user terminal 61a used by the first user. The first user uses a first virtual machine 21a on the first server 20a via the first user terminal 61a. Furthermore, the first server 20a is provided to a second user on demand in response to a request from a second user terminal 61b used by the second user. The second user uses a second virtual machine 22a on the first server 20a via the second user terminal 61b.

Each user requests a resource from each virtual machine on demand and temporarily uses the virtual machine. At this time, each virtual machine uses any number of devices. For example, in the example illustrated in FIG. 1A, the first user requests the first device 31a that is a resource from the first virtual machine 21a on demand. At this time, the first virtual machine 21a uses the first device 31a. The second user requests the second device 32a and the third device 33a that are resources from the second virtual machine 22a on demand. At this time, the second virtual machine 22a uses the second device 32a and the third device 33a.

The first virtual machine 21a is connected to the first device 31a and provides the first user terminal 61a with a virtualized environment. On the other hand, the second virtual machine 22a is connected to the second device 32a and the third device 33a and provides the second user terminal 61b with a virtualized environment.

Each of the first device 31a, the second device 32a, and the third device 33a requires maintenance work irregularly. During maintenance of a device, the virtual machine cannot use said device.

In a case of detecting a predetermined abnormality, each physical server actively issues a warning Wa (see FIG. 1C) to the warning monitoring system 92. In response to this, the warning monitoring system 92 issues a warning to an administrator or the like.

As illustrated in FIG. 1B, a maintenance request Rq is output from the maintenance instruction device 91 to the controller server 10 at any timing. The maintenance request Rq designates a device that is a maintenance target (hereinafter, referred to as a "maintenance target device").

Here, it is assumed that the maintenance request Rq designates the third device 33a as a maintenance target device. In this case, the second virtual machine 22a using the third device 33a that is a maintenance target device is an affected virtual machine.

In response to the maintenance request Rq, the controller server 10 accepts the maintenance request by the maintenance control unit 11d (fourth function). Then, the controller server 10 specifies and evacuates the affected virtual machine by the affected user specification evacuation unit 11f (sixth function) while performing warning exclusion setting on the physical server by the warning exclusion setting unit 11e (fifth function). Here, the affected user specification evacuation unit 11f only evacuates the second virtual machine 22a that is the affected virtual machine. The affected user specification evacuation unit 11*f* does not evacuate the first virtual machine 21*a*.

At this time, the controller server 10 outputs, to the first server 20*a*, a warning exclusion setting instruction Cm1 for giving an instruction for excluding (suppressing) issuance of a warning associated with the maintenance of the device by the warning exclusion setting unit 11*e* (fifth function). In response to the warning exclusion setting instruction Cm1, the first server 20*a* performs, on the filter setting unit 26*a*, filter setting for excluding (suppressing) issuance of the warning associated with the maintenance of the third device 33*a* that is the maintenance target device.

Furthermore, the controller server 10 outputs, to the first server 20*a*, an evacuation instruction Cm2 for giving an instruction for evacuating (migrating) the affected virtual machine to another server by the affected user specification evacuation unit 11*f* (sixth function). In response to the evacuation instruction Cm2, the first server 20*a* evacuates (migrates) the second virtual machine 22*a* that is the affected virtual machine to the second server 20*b*.

As a result, as illustrated in FIG. 1C, the second user terminal 61*b* is connected to the second virtual machine 22*b* constructed in the second server 20*b*. Then, the second virtual machine 22*b* of the second server 20*b* uses the second device 32*b* and the third device 33*b* and provides the second user with the same virtualized environment as that of the second virtual machine 22*a*.

At this time, even in maintenance work of the third device 33*a*, the first virtual machine 21*a* not using the third device 33*a* can be continuously used without being evacuated.

<Configuration of Controller Server (Server Maintenance Control Device)>

Hereinafter, a configuration of the controller server 10 (server maintenance control device) will be described with reference to FIG. 2. FIG. 2 is a configuration block diagram of the controller server 10.

As illustrated in FIG. 2, the controller server 10 includes a control unit 11, a storage unit 12, and a communication unit 19.

The control unit 11 includes the assignment unit 11*a*, the usage status management unit 11*b*, the warning relation management unit 11*c*, the maintenance control unit 11*d*, the warning exclusion setting unit 11*e*, and the affected user specification evacuation unit 11*f*. The control unit 11 is a CPU of the controller server 10, and implements the function of each unit by performing the control program Pr.

The assignment unit 11*a* assigns any number of devices connected to a server to virtual machines managed by users on a physical server. As a result, the virtual machines can use the assigned devices.

The usage status management unit 11*b* records the correspondence between the virtual machines managed by respective users and devices used by the virtual machines.

The warning relation management unit 11*c* records the correspondence between the devices and types of warnings that may occur during maintenance of the devices.

The maintenance control unit 11*d*, upon accepting a maintenance request Rq for a device from the external maintenance instruction device 91 or the like, determines the order of an instruction for excluding (suppressing) issuance of a warning that may occur due to the maintenance of the device, and an instruction for evacuating an affected virtual machine that is a virtual machine of a user affected by the maintenance of the device to another physical server. In the first embodiment, the maintenance control unit 11*d* causes a warning exclusion setting instruction Cm1 (see FIG. 1B) to be output to the first server 20*a* earlier than an evacuation instruction Cm2 (see FIG. 1B).

The warning exclusion setting unit 11*e* instructs the physical server to exclude (suppress) the issuance of the warning that may occur due to the maintenance of the device on the basis of the types of warnings recorded by the warning relation management unit 11*c*.

The affected user specification evacuation unit 11*f*, using an identification (ID) of the maintenance target device as a key, specifies the affected virtual machine on the basis of the correspondence between devices and virtual machines using the devices, and evacuates the affected virtual machine to another physical server. The correspondence between the devices and the virtual machines using the devices is recorded in the usage status database 12*a* by the usage status management unit 11*b*.

The storage unit 12 stores the control program Pr. Furthermore, in the storage unit 12, the usage status database 12*a* and the warning relation database 12*b* are constructed.

The usage status database 12*a* (first database) is a device assignment function for users, and records the correspondence between the virtual machines managed by the respective users and the devices used by the virtual machines.

The warning relation database 12*b* (second database) records the correspondence between each of the devices and a type of a warning that may occur for the device during maintenance.

<Configuration of Usage Status Database>

Hereinafter, a configuration of the usage status database 12*a* will be described with reference to FIG. 3. FIG. 3 is an explanatory diagram of the usage status database 12*a*.

The usage status database 12*a* associates user IDs for identifying the virtual machines of the users with device IDs of the devices used by the virtual machines. In the example illustrated in FIG. 3, the first device 31*a* is associated with the first virtual machine 21*a* of the first user. Furthermore, the second device 32*a* and the third device 33*a* are associated with the second virtual machine 22*a* of the second user.

The affected user specification evacuation unit 11*f*, upon accepting a maintenance request, specifies a virtual machine using a maintenance target device designated in the maintenance request as an affected virtual machine with reference to the usage status database 12*a*. In this manner, the affected user specification evacuation unit 11*f* can easily specify a virtual machine associated with a device ID of a maintenance target device in a short time.

<Configuration of Warning Relation Database>

Hereinafter, a configuration of the warning relation database 12*b* will be described with reference to FIG. 4. FIG. 4 is an explanatory diagram of the warning relation database 12*b*.

The warning relation database 12*b* associates device IDs with exclusion target types of warnings. Here, an "exclusion target type of a warning" means a type of a warning to be excluded from monitoring during maintenance of a device indicated by a device ID. In an example illustrated in FIG. 4, "reboot (Reboot)" is associated as an exclusion target type of a warning for the first device 31*a*. Reboot means restarting a device. Furthermore, "shut down (Shut down)" is associated as an exclusion target type of a warning for the first device 31*b*. Shut down means terminating a device and turning off power. Furthermore, "unavailable (unavailable)" is associated as an exclusion target type of a warning for 31*c*. Unavailable means that a device is unusable.

The warning exclusion setting unit 11*e*, upon accepting a maintenance request, instructs a physical server to suppress issuance of a warning that may occur due to the maintenance of a device specified in the maintenance request with reference to the warning relation database 12b. In this manner, the warning exclusion setting unit 11e can exclude (suppress) issuance of a warning that may occur due to maintenance of a device.

<Operation of Controller Server (Server Maintenance Control Device)>

Figure 5:
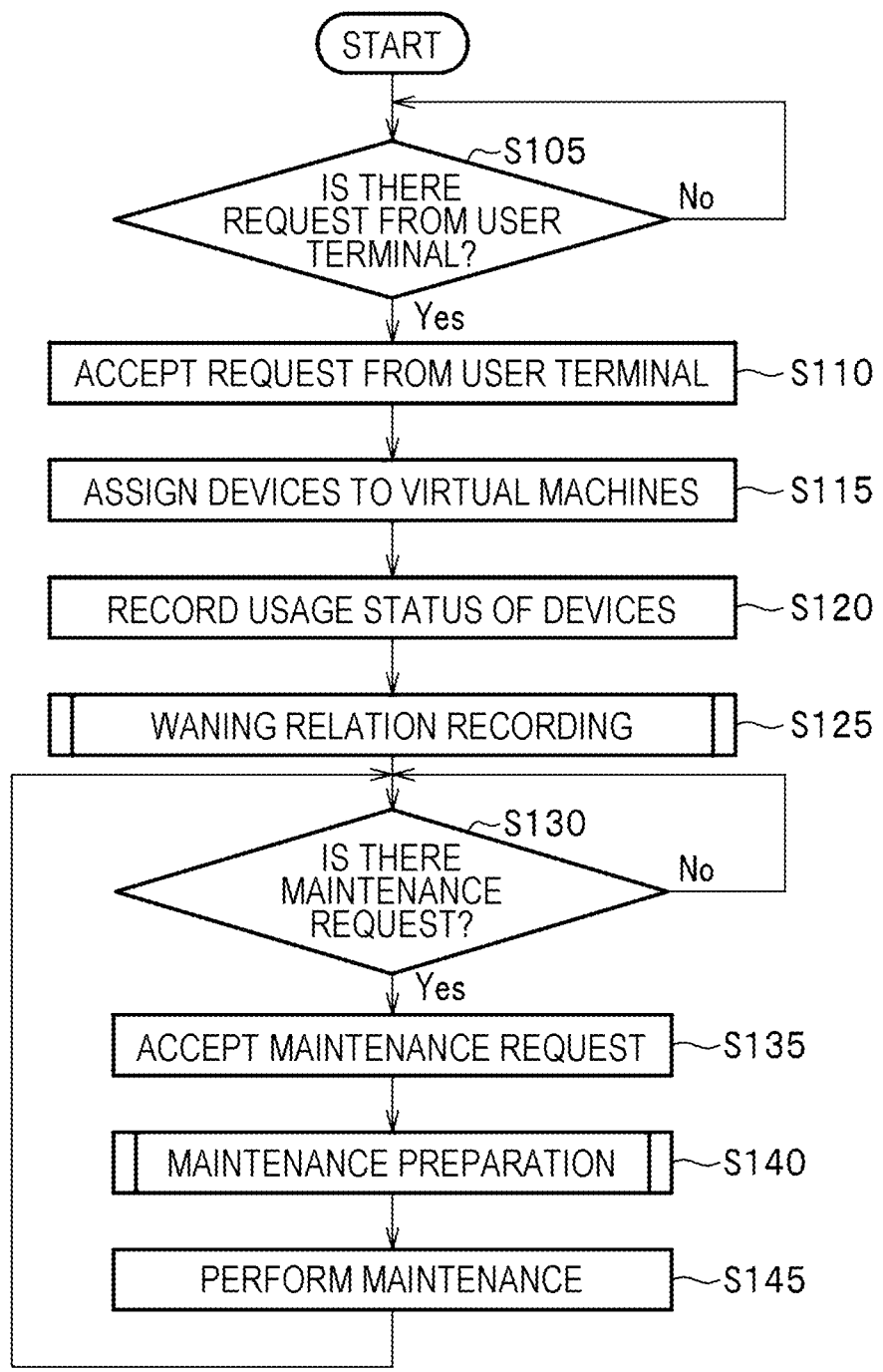
FIG. 5 is a flowchart illustrating overall operation of the controller server.
Figure 6:
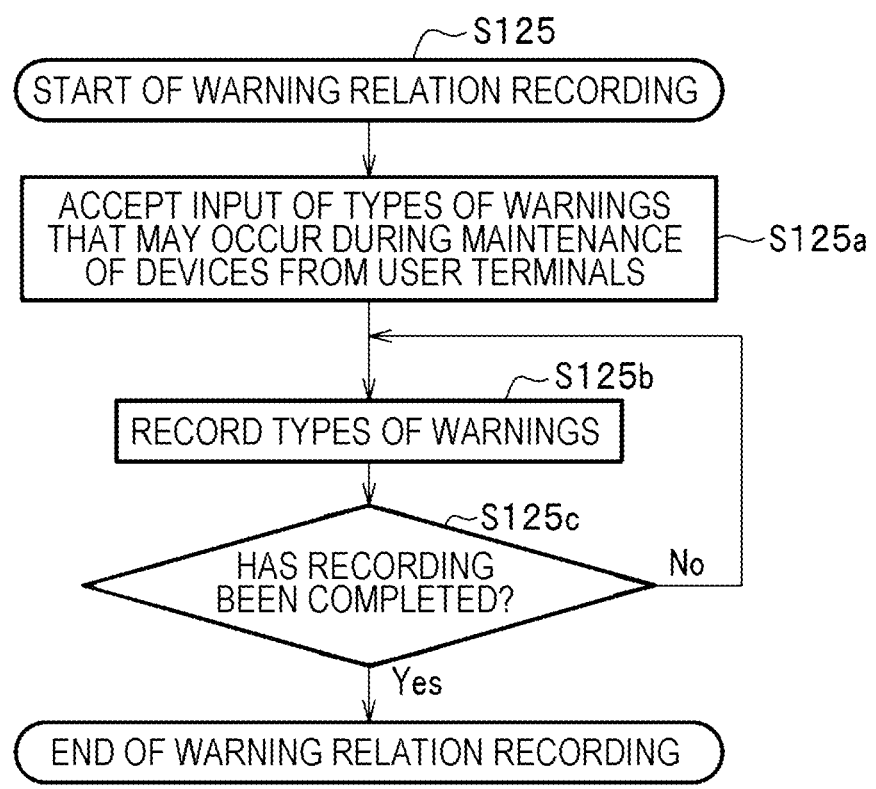
FIG. 6 is a flowchart illustrating operation of the controller server during warning relation recording.
Figure 7:
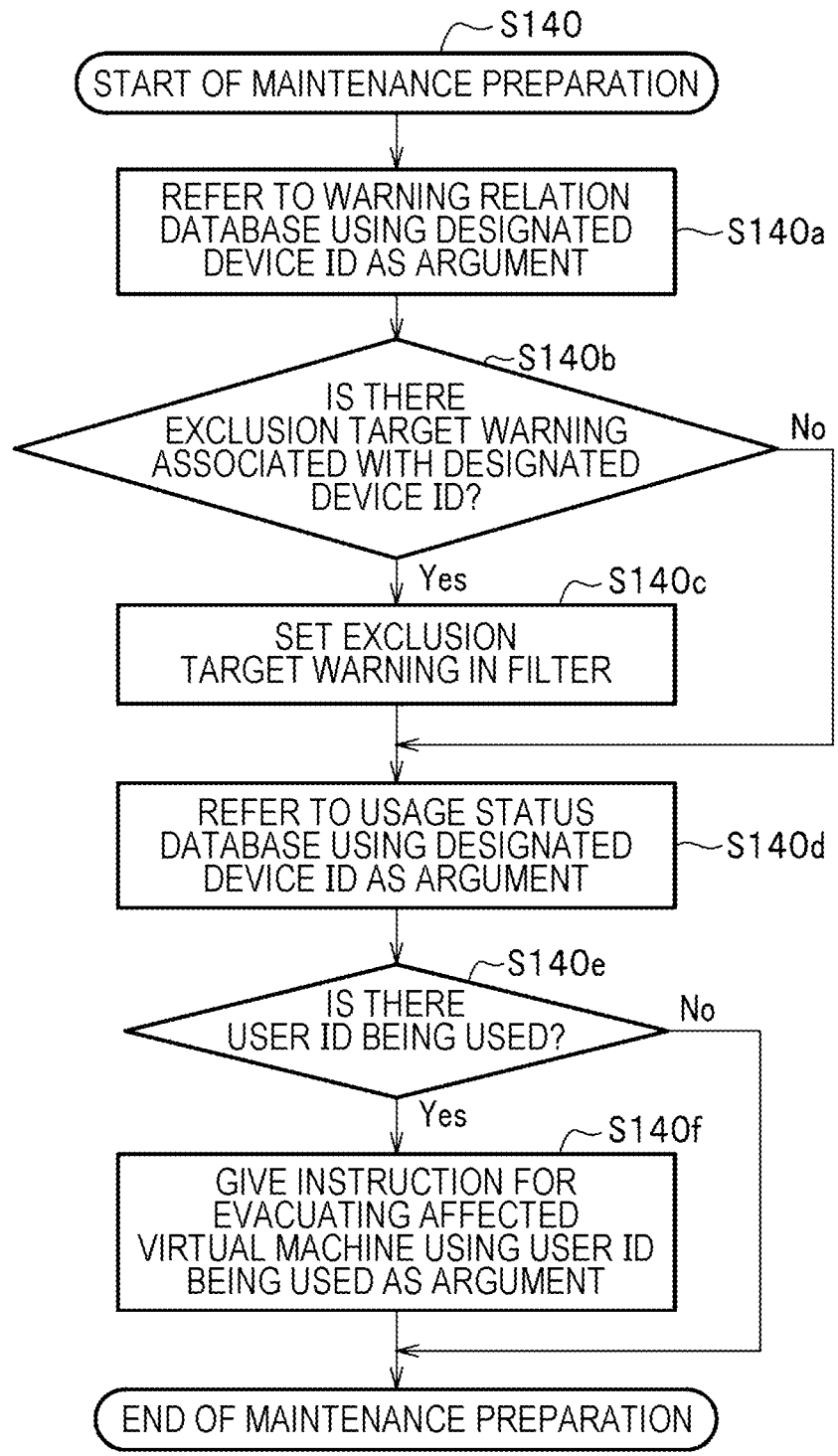
FIG. 7 is a flowchart illustrating operation of the controller server during maintenance preparation.

Hereinafter, operation of the controller server 10 (server maintenance control device) will be described with reference to FIGS. 5 to 7. FIG. 5 is a flowchart illustrating overall operation of the controller server 10. FIG. 6 is a flowchart illustrating operation of the controller server 10 during warning relation recording in step S125 illustrated in FIG. 5. FIG. 7 is a flowchart illustrating operation of the controller server 10 during maintenance preparation in step S140 illustrated in FIG. 5.

As illustrated in FIG. 5, the maintenance control unit 11d of the controller server 10 repeatedly determines whether there is a request from the maintenance instruction device 91 that is a user terminal (step S105), and in a case where there is a request from the user terminal (in a case of "Yes"), the maintenance control unit 11d accepts the request from the user terminal (step S110). The request from the user terminal includes an ID of a device to be used.

In step S105, in a case where there is no request from the user terminal (in a case of "No"), the maintenance control unit 11d returns to the processing of step S105.

Next, the assignment unit 11a of the controller server 10 assigns the requested device to a virtual machine of a user (step S115). Then, the usage status management unit 11b of the controller server 10 records the correspondence between IDs of respective virtual machines managed by users and IDs of devices used by the virtual machines in the usage status database 12a, thereby recording the usage status of the devices (step S120). Furthermore, the warning relation management unit 11c of the controller server 10 records the correspondence relation between the device IDs and types of warnings that may occur during maintenance of the devices in the warning relation database 12b (step S125).

In step S125, for example, the warning relation recording processing illustrated in FIG. 6 is performed.

As illustrated in FIG. 6, first, the warning relation management unit 11c of the controller server 10 accepts input of the types of the warnings that may occur during maintenance of the respective devices from user terminals after the users start using the devices (step S125a). Next, the warning relation management unit 11c records the types of the warnings that may occur during maintenance of the respective devices in the warning relation database 12b (step S125b). Note that the types of the warnings that may occur during maintenance of the respective devices are input by the users.

The warning relation management unit 11c determines whether recording of entire relation of the warnings that may occur during maintenance of the devices has been completed (step S125c). In step S125c, in a case where the warning relation management unit 11c determines that the recording has not been completed (in a case of "No"), the processing returns to step S125b. On the other hand, in a case where the warning relation management unit 11c determines that the recording has been completed (in a case of "Yes"), the processing of FIG. 6 ends. In this case, the processing proceeds to step S130 in FIG. 5.

Returning to FIG. 5, after step S125, the maintenance control unit 11d of the controller server 10 determines whether there is a maintenance request Rq for a device from the maintenance instruction device 91 (step S130). In a case where it is determined that there is no maintenance request Rq for a device (in a case of "No") in the determination of step S130, the processing returns to step S130.

On the other hand, in a case where it is determined that there is a maintenance request Rq for a device (in a case of "Yes"), the maintenance control unit 11d accepts the maintenance request Rq for the device (step S135). At this time, the maintenance control unit 11d determines the order of an instruction for excluding (suppressing) issuance of a warning that may occur due to the maintenance and an instruction for evacuating an affected virtual machine affected by the maintenance to another physical server. Then, the maintenance control unit 11d performs maintenance preparation (step S140).

In step S140, for example, processing illustrated in FIG. 7 is performed.

As illustrated in FIG. 7, first, the maintenance control unit 11d of the controller server 10 instructs the warning exclusion setting unit 11e to exclude (suppress) issuance of the warning that may occur due to the maintenance of the maintenance target device. In response to this, the warning exclusion setting unit 11e refers to the warning relation database 12b using a device ID given to the maintenance target device (hereinafter referred to as "designated device ID") as an argument (step S140a). As a result, the warning exclusion setting unit 11e specifies the type of the warning that may occur due to the maintenance of this device. Then, the warning exclusion setting unit 11e determines whether there is an exclusion target warning associated with the designated device ID (step S140b).

In a case where it is determined that there is no exclusion target warning associated with the designated device ID (in a case of "No") in the determination of step S140b, the processing returns to step S140d. On the other hand, in a case where it is determined that there is an exclusion target warning associated with the designated device ID (in a case of "Yes"), the warning exclusion setting unit 11e outputs a warning exclusion setting instruction to the physical server, and causes a filter setting unit of the physical server to set a warning of the exclusion target warning type associated with the designated device ID in a filter (step S140c). Specifically, as illustrated in FIG. 1B, the warning exclusion setting unit 11e outputs a warning exclusion setting instruction Cm1 to the first server 20a, and causes the filter setting unit 26a of the first server 20a to set the warning of the exclusion target warning type associated with the designated device ID. As a result, the first server 20a can suppress issuance of the warning in a case where the maintenance of the device is performed in step S145 to be described below.

In a case where it is determined that there is no exclusion target warning associated with the designated device ID (in a case of "No") in the determination in step S140b, or after step S140c, the maintenance control unit 11d instructs the affected user specification evacuation unit 11f to evacuate the affected virtual machine that is the virtual machine affected by the maintenance to another physical server. In response to this, the affected user specification evacuation unit 11f refers to the usage status database 12a using the designated device ID as an argument (step S140d). Then, the affected user specification evacuation unit 11f determines whether there is a user ID being used for the device having the designated device ID (that is, the maintenance target device) (step S140e). The user ID identifies an affected virtual machine. Here, the affected user specification evacuation unit 11f determines whether there is the affected virtual machine.

In a case where it is determined that there is a user ID being used for this device (in a case of "Yes") in the determination of step S140e, the affected user specification evacuation unit 11f instructs the physical server to evacuate the affected virtual machine using the user ID as an argument (step S140f). Specifically, as illustrated in FIG. 1B, the affected user specification evacuation unit 11f instructs the first server 20a to evacuate the second virtual machine 22a that is the affected virtual machine using the user ID being used for the third device 33a as an argument. In response to this, the second virtual machine 22a is evacuated (migrated) between the first server 20a and the second server 20b.

In a case where it is determined that there is no user ID being used (in a case of "No") in the determination of step S140e, or after step S140f, the processing of step S140 ends. In this case, the processing proceeds to step S145 in FIG. 5.

Returning to FIG. 5, after step S140, an operator or the like performs the maintenance of the device (step S145), and the processing returns to step S130.

Second Embodiment

In a server system 100A of a second embodiment, a function of automatically performing maintenance in units of devices using a device failure as a trigger is added, and a series of processing from occurrence of a failure to maintenance in units of devices and evacuation of only affected user is autonomously performed.

Figure 8:
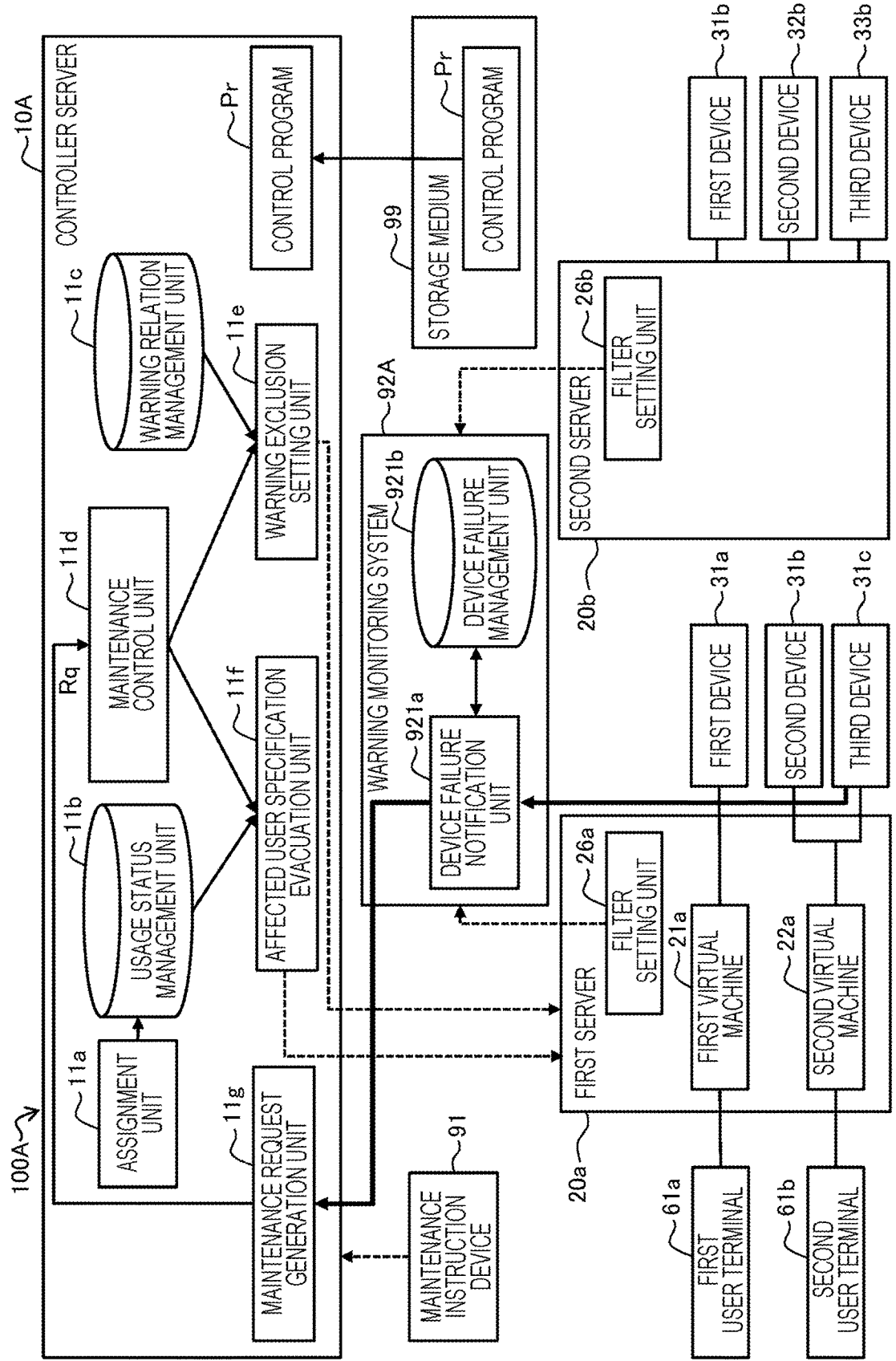
FIG. 8 is an explanatory diagram of an overall configuration and operation of a server system including a controller server (server maintenance control device) according to a second embodiment.

Hereinafter, an overall configuration and operation of the server system 100A including a controller server 10A according to the second embodiment will be described with reference to FIG. 8. FIG. 8 is an explanatory diagram of the overall configuration and the operation of the server system including the controller server 10A (server maintenance control device) according to the second embodiment.

The server system 100A illustrated in FIG. 8 includes the controller server 10A and a warning monitoring system 92A that are different from those in the first embodiment. Other configurations are similar to those of the server system 100 of the first embodiment.

The controller server 10A is a computer that functions as a server maintenance control device that controls maintenance processing of servers. The controller server 10A further includes a maintenance request generation unit 11g in addition to the same configuration as that of the controller server 10 of the first embodiment.

The warning monitoring system 92A is a system that monitors a warning issued from each of physical servers and notifies an administrator or the like, and includes a device failure notification unit 921a and a device failure management unit 921b.

Figure 9:
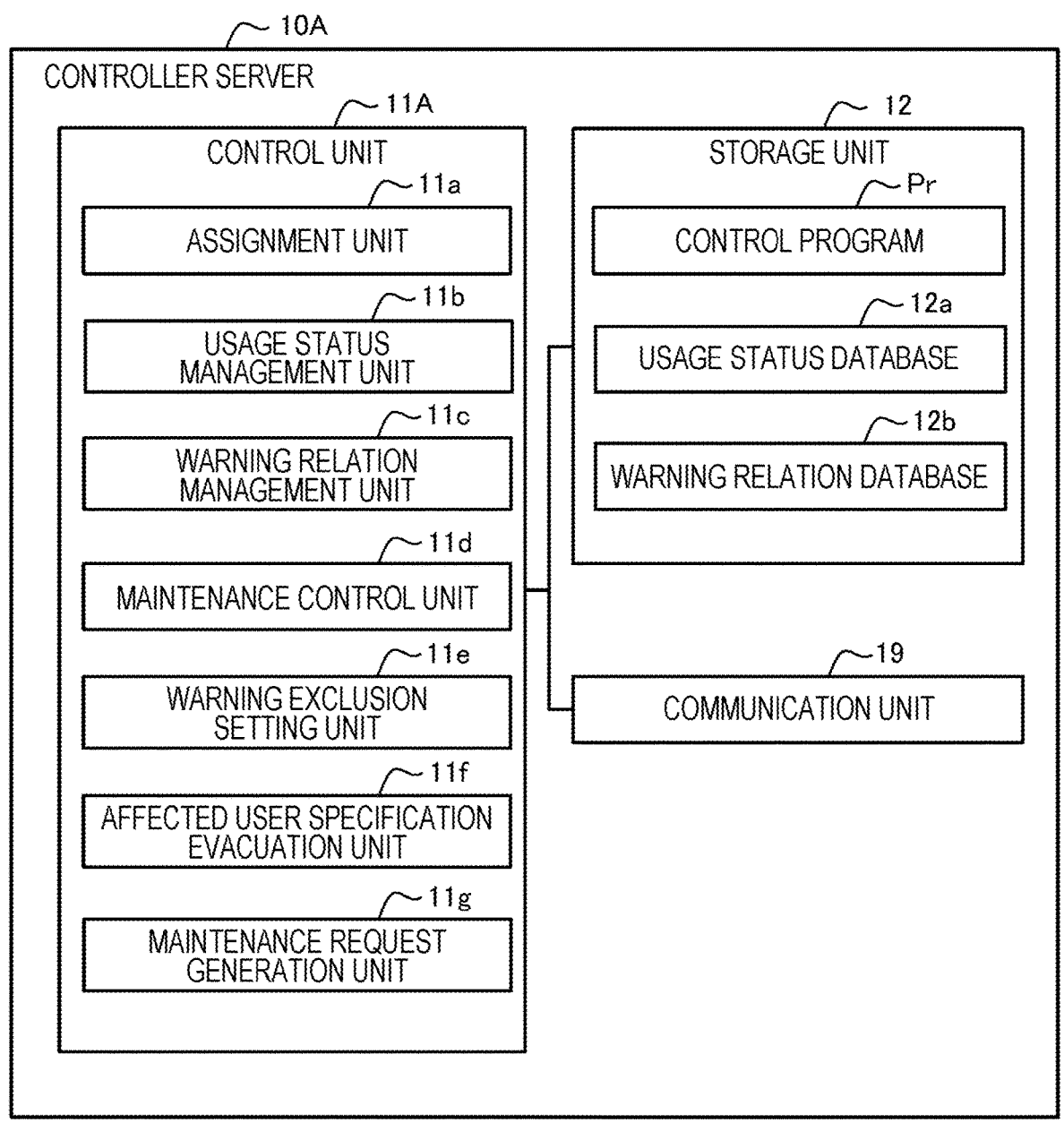
FIG. 9 is a configuration block diagram of the controller server.

The device failure notification unit 921a implements a device failure notification function (seventh function) (see FIGS. 8 and 9). The "device failure notification function" is a function of notifying the maintenance request generation unit 11g of the controller server 10A of failure information related to a device failure. That is, the device failure notification unit 921a determines whether a notification from a physical server on which the device is loaded is a device failure by comparing the notification with each record of the device failure notification function using the notification as input. If this notification relates to a device failure, the maintenance request generation unit 11g of the controller server 10A is notified of the occurrence of a failure together with information for uniquely identifying the target physical server and device.

Since the device failure notification unit 921a autonomously notifies the maintenance request generation unit 11g of the server maintenance control device of the device failure, the device failure can be quickly dealt with.

Here, the notification from a physical server on which a device is loaded is rsyslog or a simple network management protocol (SNMP) that transfers a system log to a remote server. However, the present invention is not limited thereto, and the warning monitoring system 92A may periodically check a physical server on which a device is loaded by polling.

In a case of detecting a device failure, the device failure notification unit 921a of the second embodiment autonomously notifies the maintenance request generation unit 11g. However, the present invention is not limited thereto, and the device failure notification unit 921a may notify an operator in case of detecting a device failure, and then the operator may determine whether to notify the maintenance request generation unit 11g.

Furthermore, the device failure notification unit 921a may be disposed in the controller server 10A or an independent server, and may accept a device failure notification by an interface independent of warning monitoring.

The device failure management unit 921b implements a device failure notification function. The "device failure notification function" is a function of recording failure information corresponding to device failures in a device failure database 922b (see FIG. 10). Since the device failure management unit 921b notifies the maintenance request generation unit 11g of only predetermined failure information, the load on the server maintenance control device can be reduced.

The controller server 10A internally constructs the configuration illustrated in FIG. 8 by performing a control program Pr. As a result, the controller server 10A implements an eighth function in addition to first to sixth functions similar to those of the first embodiment.

The maintenance request generation unit 11g implements a maintenance request generation function (eighth function). The "maintenance request generation function" is a function of notifying a maintenance control unit 11d of a maintenance request for dealing with a failure on the basis of device failure information and target server information in a notification from the warning monitoring system 92A. As a result, maintenance of a device can be performed using detection of the device failure as a trigger.

In a case where a failure occurs, the device failure notification unit 921a of the warning monitoring system 92A determines whether a device failure has occurred. In a case of determining that a device failure has occurred, the device failure notification unit 921a notifies the maintenance request generation unit 11g of the controller server 10 while notifying an operator (user) by a warning.

The maintenance request generation unit 11g generates a maintenance request Rq for the device on the basis of the device failure information, and notifies the maintenance control unit 11d. The maintenance request Rq for the device includes a device ID for uniquely identifying the failed device. As a result, in the second embodiment, a warning during occurrence of a failure is minimized while the user is notified of the device failure, and the effect on virtual machines is minimized.

The subsequent operation of the server system 100A is similar to the operation of the server system 100 of the first embodiment.

FIG. 9 is a configuration block diagram of the controller server 10A.

As illustrated in FIG. 9, the controller server 10A includes a control unit 11A, and a storage unit 12 and a communication unit 19 that are similar to those of the first embodiment.

The control unit 11A includes an assignment unit 11a, a usage status management unit 11b, a warning relation management unit 11c, the maintenance control unit 11d, a warning exclusion setting unit 11e, and an affected user specification evacuation unit 11f that are similar to those of the first embodiment. The control unit 11A further includes the maintenance request generation unit 11g. The control unit 11A is a CPU of the controller server 10A, and implements the function of each unit by performing the control program Pr. The function of the maintenance request generation unit 11g has already been described with reference to FIG. 8.

Figure 10:
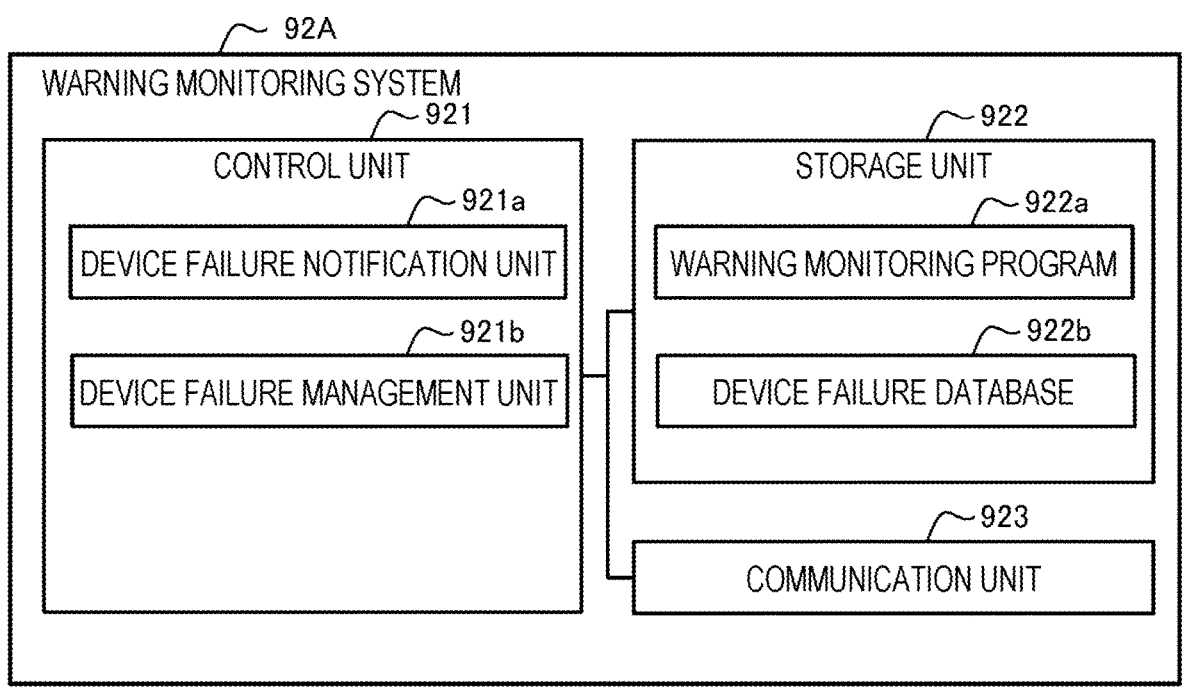
FIG. 10 is a configuration block diagram of a warning monitoring system.

FIG. 10 is a configuration block diagram of the warning monitoring system 92A.

As illustrated in FIG. 10, the warning monitoring system 92A includes a control unit 921, a storage unit 922, and a communication unit 923.

The control unit 921 includes the device failure notification unit 921a and the device failure management unit 921b. The control unit 921 is a CPU of a device included in the warning monitoring system 92A, and implements the function of each unit by performing a warning monitoring program 922a to be described below.

The device failure notification unit 921a has already been described with reference to FIG. 8.

The device failure management unit 921b implements a device failure recording function. The "device failure recording function" is a function of recording and managing failure information corresponding to device failures. The device failure recording function is implemented by the device failure management unit 921b and the device failure database 922b to be described below.

The storage unit 922 stores the warning monitoring program 922a and the device failure database 922b. The device failure database 922b is a third database in which failure information corresponding to device failures is recorded.

Figure 11:
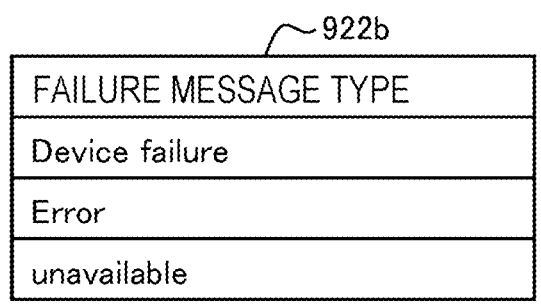
FIG. 11 is an explanatory diagram of a device failure database.

FIG. 11 is an explanatory diagram of the device failure database 922b.

As illustrated in FIG. 11, failure information corresponding to device failures is recorded in the device failure database 922b. "Device Failure" is failure information indicating that the device has failed in operation. "Error" is failure information indicating that an error has occurred during operation of the device. "unavailable" is failure information indicating that the device is unusable.

Figure 12:
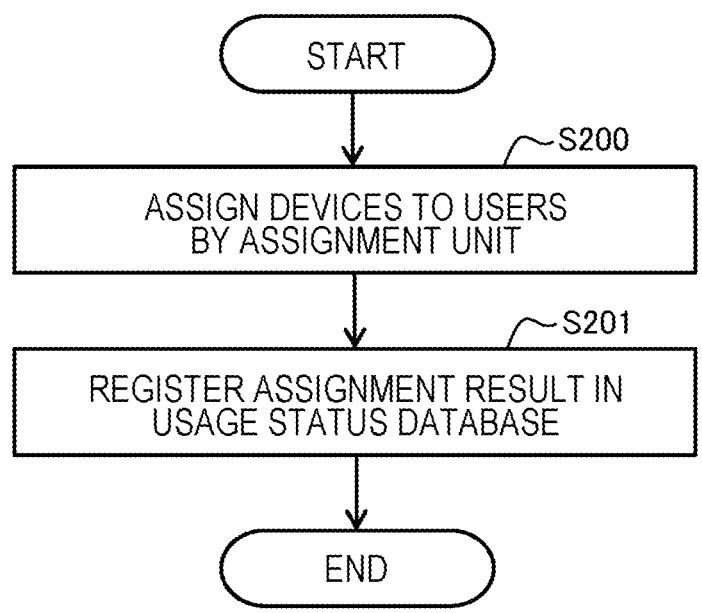
FIG. 12 is a flowchart of registration processing in a usage status database.

FIG. 12 is a flowchart of registration processing in a usage status database 12a.

First, the assignment unit 11a assigns devices to virtual machines of users (S200), and registers the assignment result in the usage status database 12a (S201), then the processing of FIG. 12 ends. As a result, the correspondence between each of the virtual machines managed by the users and a device used by each of the virtual machines is recorded in the usage status database 12a.

Figure 13:
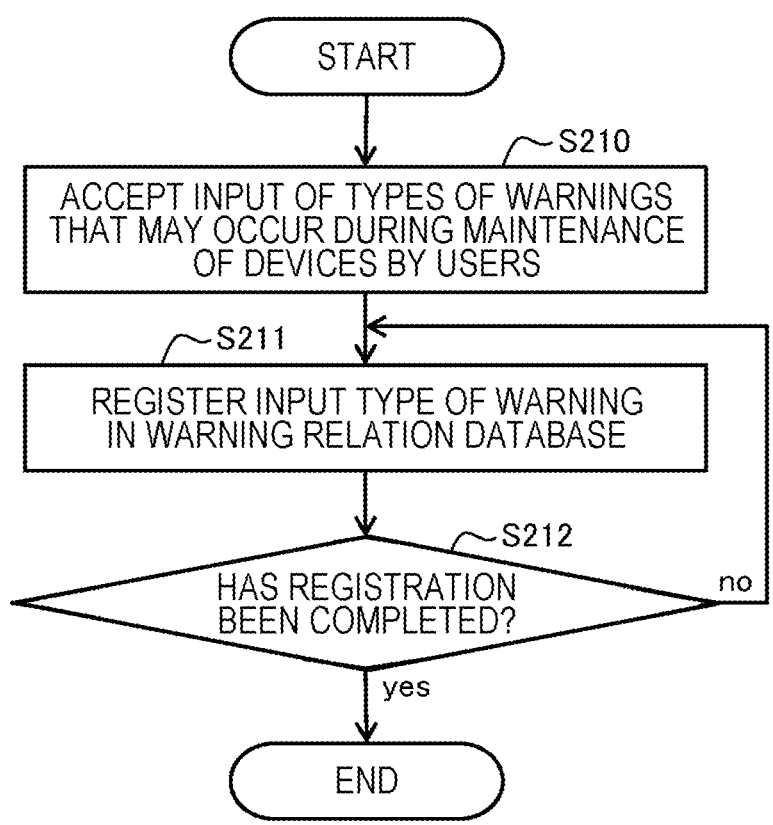
FIG. 13 is a flowchart of registration processing in a warning relation database.

FIG. 13 is a flowchart of registration processing in a warning relation database 12b.

The users input exclusion target types of warnings via terminals or the like (S210). Here, the exclusion target types of warnings refer to types of warnings that may occur during maintenance of the devices.

The warning relation management unit 11c records one of the input exclusion target types of warnings in the warning relation database 12b (S211). Then, the warning relation management unit 11c determines whether the recording has been completed (S212). In a case where the recording has not been completed (No), the warning relation management unit 11c returns to the processing of step S211, and in a case where the recording has been completed (Yes), the processing of FIG. 13 ends.

Figure 14A:
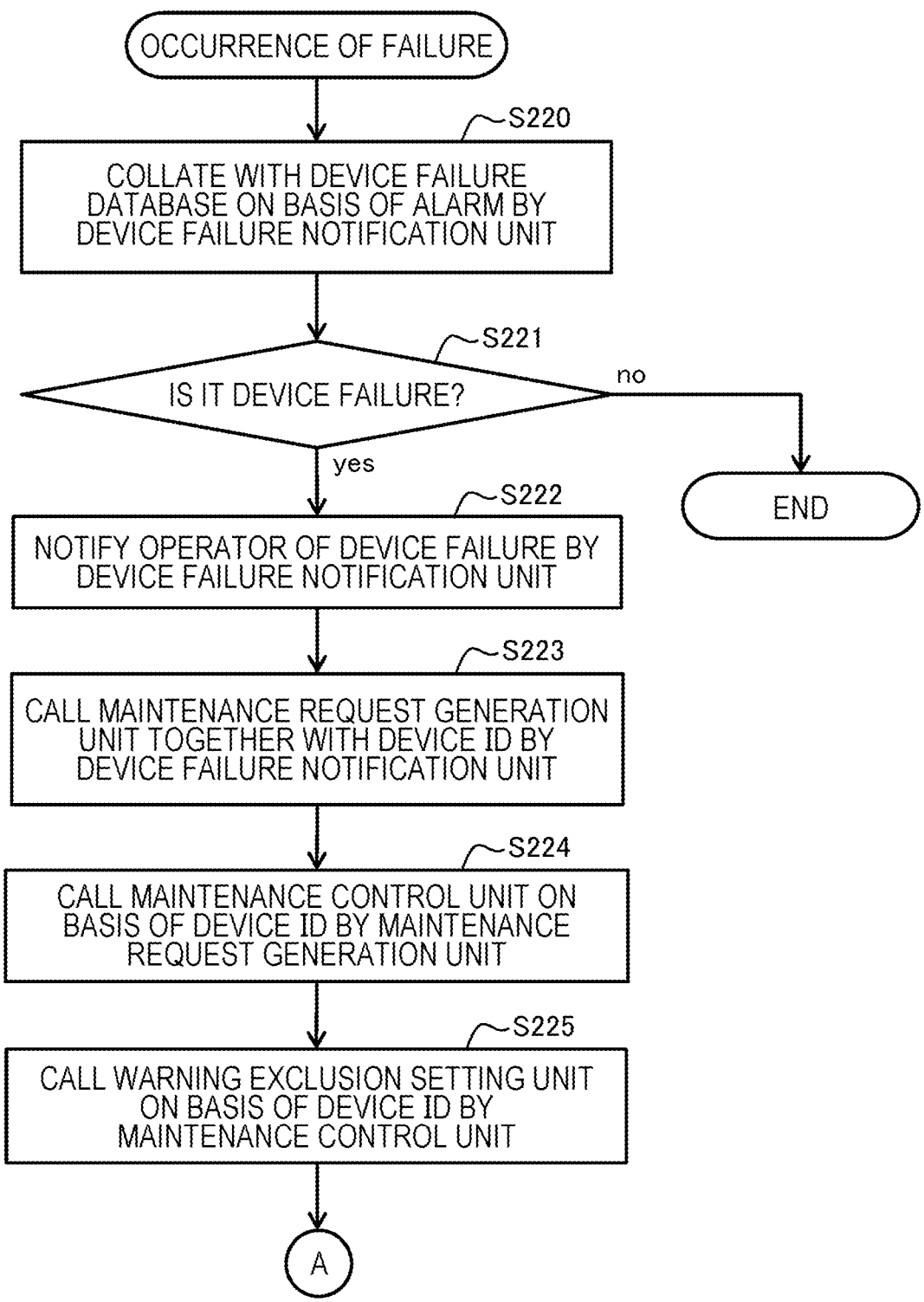
FIG. 14A is a flowchart of device failure detection processing and virtual machine evacuation processing.
Figure 14B:
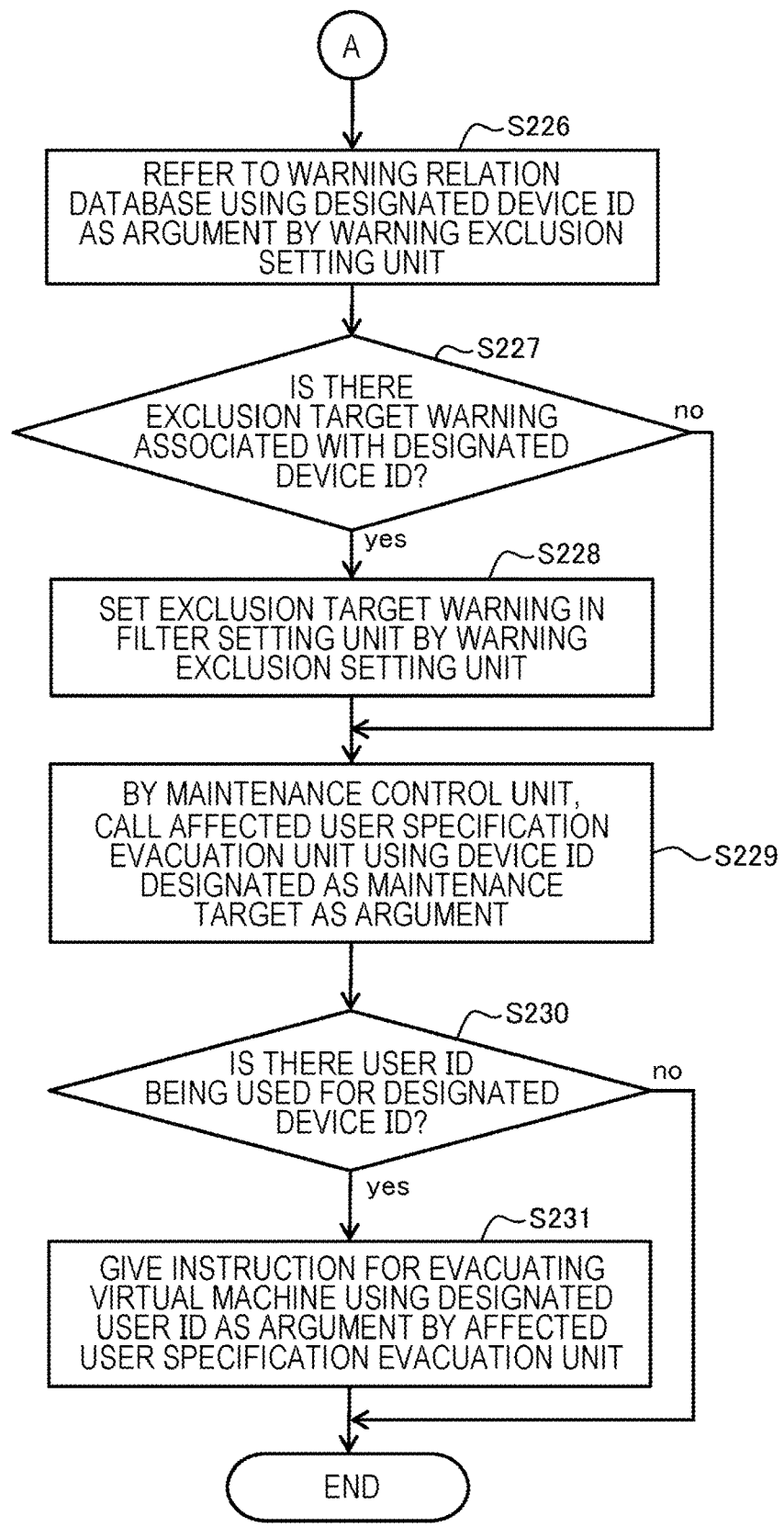
FIG. 14B is a flowchart of the device failure detection processing and the virtual machine evacuation processing.

FIGS. 14A and 14B are flowcharts of device failure detection processing and virtual machine evacuation processing.

First, the device failure notification unit 921a of the warning monitoring system 92A collates with the device failure database 922b on the basis of an alarm from a device (S221). Then, in a case where the alarm is not a device failure (No), the device failure notification unit 921a ends the processing of FIG. 14A, and in a case where the alarm is a device failure (Yes), the processing proceeds to step S222. As described above, since the device failure notification unit 921a notifies the controller server 10A only in a case of a device failure, the load on the controller server 10A can be reduced.

In step S222, the device failure notification unit 921a notifies an operator of the device failure. The device failure notification unit 921a further calls the maintenance request generation unit 11g together with a device ID included in the alarm (S223).

The maintenance request generation unit 11g calls the maintenance control unit 11d on the basis of the device ID (S224). Then, the maintenance control unit 11d calls the warning exclusion setting unit 11e on the basis of the device ID so as to instruct the warning exclusion setting unit 11e to exclude (suppress) issuance of a warning that may occur due to maintenance of the maintenance target device (S225), and then the processing proceeds to step S226 in FIG. 14B.

In step S226 in FIG. 14B, the warning exclusion setting unit 11e refers to the warning relation database 12b using the device ID given to the maintenance target device that is a designated device ID as an argument. As a result, the warning exclusion setting unit 11e specifies the type of the warning that may occur due to the maintenance. Then, the warning exclusion setting unit 11e determines whether there is an exclusion target warning associated with the designated device ID (S227).

In step S227, in a case where there is an exclusion target warning associated with the designated device ID (Yes), the processing proceeds to step S228, and the warning exclusion setting unit 11e sets the exclusion target warning in a filter setting unit, and the processing proceeds to step S229. In a case where there is no exclusion target warning associated with the designated device ID (No), the warning exclusion setting unit 11e proceeds to step S229.

In step S229, the maintenance control unit 11d calls the affected user specification evacuation unit 11f using the device ID designated as the maintenance target as an argument.

In step S230, the affected user specification evacuation unit 11f determines whether there is a user ID related to a virtual machine using the designated device ID. In a case where there is a user ID related to the virtual machine using the designated device ID (Yes), the affected user specification evacuation unit 11f gives an instruction for evacuating the virtual machine using the designated user ID as an argument, and the processing of FIG. 14B ends. In a case where there is no user ID related to the virtual machine using the designated device ID (No), the affected user specification evacuation unit 11f ends the processing in FIG. 14B.

The warning monitoring system 92A is activated using a device failure as a trigger, and the maintenance control unit 11d is further activated on the basis of the device information. As a result, the warning monitoring system 92A issues a warning associated with failure detection, and the controller server 10A evacuates an affected virtual machine using the device after suppressing issuance of a warning associated with maintenance of the device. As a result, maintenance can be quickly performed in a case of a failure of a device connected to a server.

<Effects>

Hereinafter, configurations and effects of the server maintenance control device according to the present invention will be described.

(1) A server maintenance control device according to the present invention includes an assignment unit that assigns devices connected to a server to virtual machines managed by users, a usage status management unit that records correspondence between the virtual machines and devices used by the virtual machines, a warning relation management unit that records types of warnings that may occur for each of the devices during maintenance, a maintenance control unit that, upon accepting a maintenance request, determines an order of an instruction for suppressing issuance of a warning that may occur for the devices during maintenance and an instruction for evacuating an affected virtual machine affected by maintenance among the virtual machines to another server, a warning exclusion setting unit that instructs the server to suppress issuance of a warning that may occur for a device during the maintenance on the basis of the types of warnings recorded in the warning relation management unit, and an affected user specification evacuation unit that specifies the affected virtual machine on the basis of correspondence between the virtual machines and devices used by the virtual machines recorded in the usage status management unit, and evacuates the affected virtual machine from the server to the another server.

Such a server maintenance control device according to the present invention manages assignment of devices to each of virtual machines. Then, in a case of performing maintenance on a maintenance target device connected to a server (third device 33a), the server maintenance control device according to the present invention specifies a virtual machine assigned to the maintenance target device and evacuates (migrates) the virtual machine from the server (first server 20a) to another server (second server 20b) while causing the server (first server 20a) to perform filter setting so that a warning generated in association with the maintenance is not issued.

In this manner, the server maintenance control device according to the present invention, on a server to which a maintenance target device is connected, can suppress issuance of a warning associated with maintenance while suppressing processing of evacuating a virtual machine not using the device to another physical server. As a result, the server maintenance control device according to the present invention can continue the operation of other virtual machines except an affected virtual machine. Furthermore, issuance of a warning associated with maintenance of a device can be suppressed.

(2) The server maintenance control device according to claim 1, in which the usage status management unit records correspondence between the virtual machines and devices used by the virtual machines in a first database, and the affected user specification evacuation unit, upon accepting a maintenance request, specifies a virtual machine using a device designated in the maintenance request as the affected virtual machine with reference to the first database.

In this manner, the server maintenance control device according to the present invention can easily specify a virtual machine associated with a device ID of a maintenance target device in a short time.

(3) The server maintenance control device according to claim 1, in which the warning relation management unit records correspondence relation between each of the devices and an exclusion target type of a warning to be excluded from monitoring during maintenance of each of the devices in a second database, and the warning exclusion setting unit, upon accepting a maintenance request, instructs the server to suppress issuance of a warning that may occur due to maintenance of a device designated in the maintenance request with reference to the second database.

In this manner, the server maintenance control device according to the present invention can exclude (suppress) issuance of a warning that may occur due to maintenance of a device.

(4) The server maintenance control device according to claim 1 further including a maintenance request generation unit that generates a maintenance request of a device related to failure information of any of the devices on the basis of the failure information.

In this manner, maintenance of a device can be performed using detection of the device failure as a trigger.

(5) A server maintenance system of the present invention includes the server maintenance control device according to (4), and a warning monitoring device including a device failure notification unit that, upon detecting a failure of a device, notifies the maintenance request generation unit of failure information of said device.

Since the maintenance request generation unit of the server maintenance control device is notified of a device failure in this manner, the device failure can be quickly dealt with.

(6) The server maintenance system according to claim 5, in which the warning monitoring device includes a third database in which failure information of which the device failure notification unit notifies the maintenance request generation unit is recorded.

Since the maintenance request generation unit is notified of only predetermined failure information in this manner, the load on the server maintenance control device can be reduced.

(7) A server maintenance control method according to the present invention is the server maintenance control method for a server maintenance control device, in which the server maintenance control device performs assigning devices connected to a server to virtual machines managed by users, recording correspondence between the virtual machines and devices used by the virtual machines in a first database, recording types of warnings that may occur for each of the devices during maintenance in a second database, accepting a maintenance request, instructing the server to exclude issuance of a warning that may occur for the devices during maintenance on the basis of the types of warnings recorded in the second database, and specifying an affected virtual machine that is the virtual machine affected by maintenance on the basis of correspondence between the virtual machines and devices used by the virtual machines recorded in the first database, and evacuating the affected virtual machine from the server to another server.

In this manner, the server maintenance control method according to the present invention, on a server to which a maintenance target device is connected, can suppress issuance of a warning associated with maintenance while suppressing processing of evacuating a virtual machine not using the device to another server. As a result, the server maintenance control method according to the present invention can make the operation of other virtual machines except an affected virtual machine continued. Furthermore, issuance of a warning associated with maintenance of a device is suppressed.

(8) A program according to the present invention causes a computer as a server maintenance control device to perform a procedure of assigning devices connected to a server to virtual machines managed by users, a procedure of recording correspondence between the virtual machines and devices used by the virtual machines in a first database, a procedure of recording types of warnings that may occur for each of the devices during maintenance in a second database, a procedure of, upon accepting a maintenance request, determining an order of an instruction for suppressing issuance of a warning that may occur due to maintenance and an instruction for evacuating an affected virtual machine affected by maintenance among the virtual machines to another server, a procedure of instructing the server to exclude issuance of a warning that may occur due to the maintenance on the basis of the types of warnings recorded in the second database, and a procedure of specifying the affected virtual machine on the basis of correspondence between the virtual machines and devices used by the virtual machines recorded in the first database, and evacuating the affected virtual machine from the server to the another server.

In this manner, the program according to the present invention, on a server to which a maintenance target device is connected, can suppress issuance of a warning associated with maintenance while suppressing processing of evacuating a virtual machine not using the device to another server. As a result, the program according to the present invention can make the operation of other virtual machines except an affected virtual machine continued. Furthermore, issuance of a warning associated with maintenance of a device is suppressed.

Note that the present invention is not limited to the above embodiments, and various changes and modifications can be made without departing from the gist thereof. Furthermore, the above embodiments have been described in detail in order to facilitate understanding of the gist of the present invention. Therefore, the present invention is not necessarily limited to one including all the components described above. Furthermore, in the present invention, another component can be added to a certain component, or some components can be changed to other components. Furthermore, in the present invention, some components can be eliminated.

REFERENCE SIGNS LIST 10, 10A Controller server (server maintenance control device)
11, 11A Control unit
11a Assignment unit
11b Usage status management unit
11c Warning relation management unit
11d Maintenance control unit
11e Warning exclusion setting unit
11f Affected user specification evacuation unit
11g Maintenance request generation unit
12 Storage unit
12a Usage status database (first database)
12b Warning relation database (second database)
19 Communication unit
20a First server
20b Second server
21a First virtual machine
22a, 22b Second virtual machine
26a, 26b Filter setting unit
31a, 31b First device
32a, 32b Second device
33a, 33b Third device
61a First user terminal
61b Second user terminal
91 Maintenance instruction device
92, 92A Warning monitoring system
921 Control unit
921a Device failure notification unit
921b Device failure management unit
922 Storage unit
922a Warning monitoring program
922b Device failure database (third database)
923 Communication unit
99 Storage medium
100, 100A Server system (server maintenance system)
Cm1 Warning exclusion setting instruction
Cm2 Evacuation instruction
Pr Control program
Rq Maintenance request
Wa Warning

The invention claimed is:

1. A server maintenance control device comprising:
a processor; and
a memory device storing instructions that, when executed by the processor, configure the processor to:
  record first correspondence between virtual machines and corresponding devices used by the virtual machines, wherein the devices are connected to a server;
  record second correspondence between the devices and corresponding types of warnings that occur for each of the devices during maintenance of the devices;
  accept a maintenance request, wherein an order of a first instruction and a second instruction of the instructions is based on the acceptance of the maintenance request, wherein the first instruction when executed suppresses issuance of corresponding warnings that occur for each of the devices during the maintenance, and the second instruction when executed evacuates a virtual machine of the virtual machines affected by the maintenance from the server to another server;
  instruct the server to execute the first instruction based on the recorded second correspondence; and
  execute the second instruction based on the recorded first correspondence.

2. The server maintenance control device according to claim 1, wherein the processor is further configured to:
  record the first correspondence in a first database,
  wherein an indication of the affected virtual machine using a corresponding device designated in the maintenance request is based on the recorded first correspondence in the first database.

3. The server maintenance control device according to claim 1, wherein the processor is further configured to:
  record third correspondence between each of the devices and an exclusion target type of a warning to be excluded from monitoring during the maintenance of each of the devices in a second database, and
  upon accepting the maintenance request, instruct the server to suppress issuance of a warning that occurs due to the maintenance of a device designated in the maintenance request with reference to the second database.

4. The server maintenance control device according to claim 1, wherein the processor is further configured to:
generate a maintenance request of a device based on failure information of any of the devices.

5. A server maintenance system comprising:
the server maintenance control device according to claim 4; and
a warning monitoring device comprising a processor configured to notify the server maintenance control device of failure information of a device upon failure of the device.

6. The server maintenance system according to claim 5, wherein the warning monitoring device comprises a third database, wherein the failure information of the device is recorded in the third database.

7. A server maintenance control method, comprising:
recording first correspondence between virtual machines and corresponding devices used by the virtual machines in a first database, wherein the devices are connected to a server;
recording second correspondence between the devices and corresponding types of warnings that occur for each of the devices during maintenance of the devices in a second database;
accepting a maintenance request, wherein an order of a first instruction and a second instruction is based on accepting the maintenance request, wherein the first instruction when executed excludes issuance of corresponding warnings that occur for each of the devices during the maintenance, and the second instruction when executed evacuates a virtual machine of the virtual machines affected by the maintenance from the server to another server;
instructing the server to execute the first instruction based on the second correspondence recorded in the second database; and
executing the second instruction based on the first correspondence recorded in the first database.

8. A non-transitory computer readable medium storing a program, wherein execution of the program causes a computer to execute:
recording first correspondence between virtual machines and corresponding devices used by the virtual machines in a first database, wherein the devices are connected to a server;
recording second correspondence between the devices and corresponding types of warnings that occur for each of the devices during maintenance of the devices in a second database;
accepting a maintenance request, wherein an order of a first instruction and a second instruction is based on accepting the maintenance request, wherein the first instruction when executed suppresses issuance of corresponding warnings that occur for each of the devices during the maintenance, and the second instruction when executed evacuates a virtual machine of the virtual machines affected by the maintenance from the server to another server;
instructing the server to execute the first instruction based on the second correspondence recorded in the second database; and
executing the second instruction based on the first correspondence recorded in the first database.

* * * * *